United States Patent

Bellemore et al.

[11] Patent Number: 5,450,770
[45] Date of Patent: Sep. 19, 1995

[54] INTEGRATED ROTARY DRIVE APPARATUS

[75] Inventors: Arthur J. Bellemore, Chelmsford; Thomas K. Hebert, Groveland; David B. Larsen, Woburn, all of Mass.

[73] Assignee: Miles Inc., Wilmington, Mass.

[21] Appl. No.: 45,419

[22] Filed: Apr. 9, 1993

[51] Int. Cl.⁶ ............................. G05G 1/00; H02P 1/22
[52] U.S. Cl. ................................. 74/572; 74/574; 318/268
[58] Field of Search ........................... 74/572–574; 318/268–270, 617

[56] References Cited

U.S. PATENT DOCUMENTS

| | | | |
|---|---|---|---|
| 2,314,362 | 12/1959 | Schmidt | 74/572 |
| 4,629,947 | 12/1986 | Hammerslag et al. | 74/572 X |
| 4,730,154 | 3/1988 | Pinson | 74/572 X |
| 4,735,382 | 4/1988 | Pinson | 74/572 |
| 4,785,228 | 11/1988 | Goddard | 74/572 X |
| 4,827,171 | 5/1989 | Bertram et al. | 74/572 X |
| 4,995,282 | 2/1991 | Schumacher | 74/572 |
| 5,065,060 | 11/1991 | Takahashi et al. | 74/572 X |
| 5,277,546 | 1/1994 | Frey et al. | 74/572 X |

FOREIGN PATENT DOCUMENTS

| | | | |
|---|---|---|---|
| 58-131446 | 5/1983 | Japan | 74/572 |
| 4-307153 | 10/1992 | Japan | 74/572 |
| WO93/03292 | 2/1993 | WIPO | 74/572 |

*Primary Examiner*—Vinh T. Luong
*Attorney, Agent, or Firm*—Richard J. Birch

[57] ABSTRACT

An integrated rotary drive apparatus for driving an element to be rotated in a controlled manner, comprises; a coupling shaft coupled to the element to be rotated, a drive shaft having a hollow portion within which the coupling shaft engages, a shaftless DC motor armature coupled to the coupling shaft for directly driving the coupling shaft, and a flywheel and rotary encoder disk coupled to the drive shaft to rotate therewith. The integrated rotary drive further includes a first enclosure section, for mounting to a non-rotating frame member for supporting the integrated rotary drive, and a second enclosure section mounted to the first enclosure section, for supporting a non-rotating optical encoder reader in proximity to the rotary encoder disk for providing a feedback signal, and for supporting a non-rotating DC motor stator in proximity to the DC motor armature for driving the DC motor armature when a DC current is applied to the stator.

20 Claims, 5 Drawing Sheets

INTEGRATED ROTARY DRIVE APPARATUS

BACKGROUND OF THE INVENTION

1. Field of the Invention

The present invention relates to rotary drive systems and specifically those rotary drive systems driven by an electric motor which require control refinement by a closed loop electronic feedback system. In particular, the present invention relates to the mechanical design of a rotary drive system having a closed loop electronic feedback controller which varies the torque output from the electric motor for the purpose of rotating a rotatable body in a controlled manner.

2. Background of the Invention

A controlled rotary drive system typically comprises a mechanical system and a closed loop electronic control system. Such a mechanical system at least includes an electric motor, a rotatable body to be rotated in a controlled manner, a feedback device, e.g. a tachometer or encoder, and at least one shaft connecting and transferring torque from the motor to the rotatable body. In general, the electric motor armature or rotor is mechanically coupled to a motor shaft, hereinafter referred to as the drive shaft, and a first mechanical coupling is used to couple the drive shaft either directly to the body to be rotated in a controlled manner or to a further mechanical coupling which can include a capstan, a belt and pulley, a lead screw or gear coupling connecting the first mechanical coupling and the body to be rotated.

The closed loop electronic control system at least includes, a command signal representative of some desired characteristic of the body to be rotated in a controlled manner, e.g. representing position, velocity or torque, a feedback signal proportional to some parameter being measured by the feedback device, a signal processor for comparing the command signal with the feedback signal, an error signal, generated by the signal processor and an amplifier to amplify the generated error signal.

It is well known in control theory, see e.g. G. Beirnson, PRINCIPLES OF FEEDBACK CONTROL VOLUME 1, Wiley-Interscience Publication, John Wiley & Sons, 1988 pages 10 through 15 and VOLUME 2, 1988 Chapter 10, that the complex ratio of the system feedback signal to the system error signal is defined as the "loop transfer function". Such a loop transfer function is representative of the combined electro-mechanical performance of the loop, and is defined as a phasor having a magnitude equal to the "loop gain" and a phase angle equal to the "loop phase". The loop transfer function provides a quantitative means of indicating the ability of the loop to control the parameters of the body to be controlled. It is also well known that the loop transfer function varies in magnitude and phase as a function of the frequency of the error signal.

In general, it is necessary for a feedback loop to have a loop gain of at least unity in order to have effective control action on the body to be controlled and a phase lag of less that 180° to remain stable. Since loop gain necessarily decreases with increasing frequency, and loop phase necessarily increases with increasing frequency, there exists for every control loop a "gain crossover frequency" above which the loop gain is less than unity and a "phase crossover frequency" above which the loop phase lag is greater than 180°. It therefor follows that the an error signal having a frequency below the gain crossover frequency is magnified while, an error signal having a frequency above the gain crossover frequency is attenuated. The "bandwidth" of a control loop can be defined as the range of frequencies from zero up to the gain crossover frequency. In general it is a goal in control systems to provide maximum gain at low frequencies while at the same time providing maximum loop bandwidth. In addition, it is also a design goal that the loop phase crossover frequency be outside the loop bandwidth. Loop bandwidth is a means of quantifying how quickly the loop can vary the parameters being controlled.

A fundamental problem with the use of feedback control is that feedback can produce oscillations in either the control loop or in the mechanical system under control. Such oscillations occur when the frequency of the feedback signal is equal to or nearly equal to a system resonance frequency, i.e. a frequency where system gain is very large. A particular problem of controlled rotating systems is the excitation of mechanical torsion resonance frequencies of the drive mechanics and especially when these mechanical torsional resonance frequencies fall within the bandwidth of the control loop.

Mechanical oscillations occur as a result of different regions of the mechanical system having different angular positions and phases relative to each other such that some regions actually have opposing velocity vectors. This results in opposing torsional loads winding up the mechanical drive like a spring. The condition can be further reinforced by the control loop which also begins to oscillate at the mechanical torsional resonance frequency in an attempt to regain control. Mechanical resonance conditions can damage the mechanical system and at least result in a breakdown of effective motion control.

In general it is common in motion control systems to overcome mechanical oscillations electrically by the use of a notch filter to attenuate the system response at certain mechanical torsional resonance frequencies. A notch filter for use in motion control systems is described e.g. by B. Kuo and J. Tal, in, DC MOTORS AND CONTROL SYSTEMS, SRL Publishing Illinois, 1978 page 125, however such a filter can shift the loop phase crossover frequency inside the loop bandwidth adding electrical oscillation modes which must be otherwise compensated for.

In U.S. Pat. No. 4,507,592, R. Anderson teaches the use of stored motion profiles, stored in read-only memory and selected on the basis of input command signals and used to avoid excitation of certain mechanical resonance frequencies. This method requires prior knowledge of the velocity profiles required and may not account for load variations at the rotating body under control.

In U.S. Pat. No. 4,873,887, A. Rainer et al. teach the use of a torsion-vibration damper which alters the amplitude of mechanical oscillations by reducing system gain at certain torsional resonance frequencies but does not change the frequency of mechanical oscillation.

The parameters governing torsional resonance in a rotary drive system can be very complex, however for a simple shaft, see e.g. DC MOTORS AND CONTROL SYSTEMS by B. Kuo and J. Tal, SRL Publishing Illinois, page 124, it's fundamental torsional resonance frequency is determined by the shaft stiffness and its equivalent moment of inertia. According to Kuo and Tal, either an increase in shaft stiffness or a decrease in equivalent moment of inertia can each have the effect of increasing the fundamental torsional resonance frequency of the shaft. Furthermore, shaft stiffness and equivalent moment of inertia are completely determined by the shafts diameter, shear modulus of elasticity and length. In addition, the shaft diameter plays the most influential role on both parameters. It therefor follows that the fundamental torsional resonance frequency of a rotary drive can be increased by increasing the drive shaft diameter and shortening its length.

Given the fundamentals of controlled rotary drive systems outlined above and given the general goal of increasing control system bandwidth without exciting mechanical resonance frequencies, it is accordingly a general object of the present invention to increase the torsional resonance frequency of a mechanical rotational drive system in order that the closed loop electronic control system bandwidth can be increased.

It is a further object of the present invention to reduce the number of components of a mechanical rotational drive system thereby reducing system cost.

It is a still further object of the present invention to improve the accuracy of the motion feedback system by increasing the rotational drive stiffness such that the feedback device mounted to the drive has an increased response bandwidth.

SUMMARY OF THE INVENTION

The invention provides a compact, cost reduced integrated rotary drive system having a fundamental torsional resonance frequency which is increased over rotary drives described in the prior art by the use of a larger effective shaft diameter and reduced effective shaft length. In addition, the drive provides mechanical coupling between an electric motor, an inertia flywheel, a feedback device and an element to be rotated in a controlled manner without the need for conventional mechanical shaft coupling devices.

The integrated rotary drive comprises, a separable enclosure having ball bearings or bushings mounted therein to support a drive shaft passing therethrough. The separable enclosure includes a first mounting interface for mounting an electric motor stator thereto and a second mounting interface for mounting the separable enclosure to a frame.

The inertia flywheel and feedback device are mounted to the drive shaft. The electric motor armature is mounted to the drive shaft to rotate the drive shaft, flywheel and feedback device in a manner which can be controlled by a closed loop electronic servo device. The drive shaft is mechanically coupled to an element to be rotated in a controlled manner.

The invention as described can also be constructed without the use of a separable enclosure such that the bearings, drive shaft, feedback device and electric motor are mounted directly to a frame.

BRIEF DESCRIPTION OF THE DRAWINGS

The objects and features set forth above and other objects and features of the invention will best be understood from a detailed description of a preferred embodiment, selected for the purposes of illustration and shown in the accompanying drawings, in which.

DETAILED DESCRIPTION OF THE INVENTION

Referring now to FIGS. 1 through 5, an integrated rotary drive is indicated generally by reference numeral 10. Drive 10 includes a hollow shaft assembly, indicated generally by reference numeral 12 and a shaftless electric DC motor indicated generally by reference numeral 14.

Figure 1:
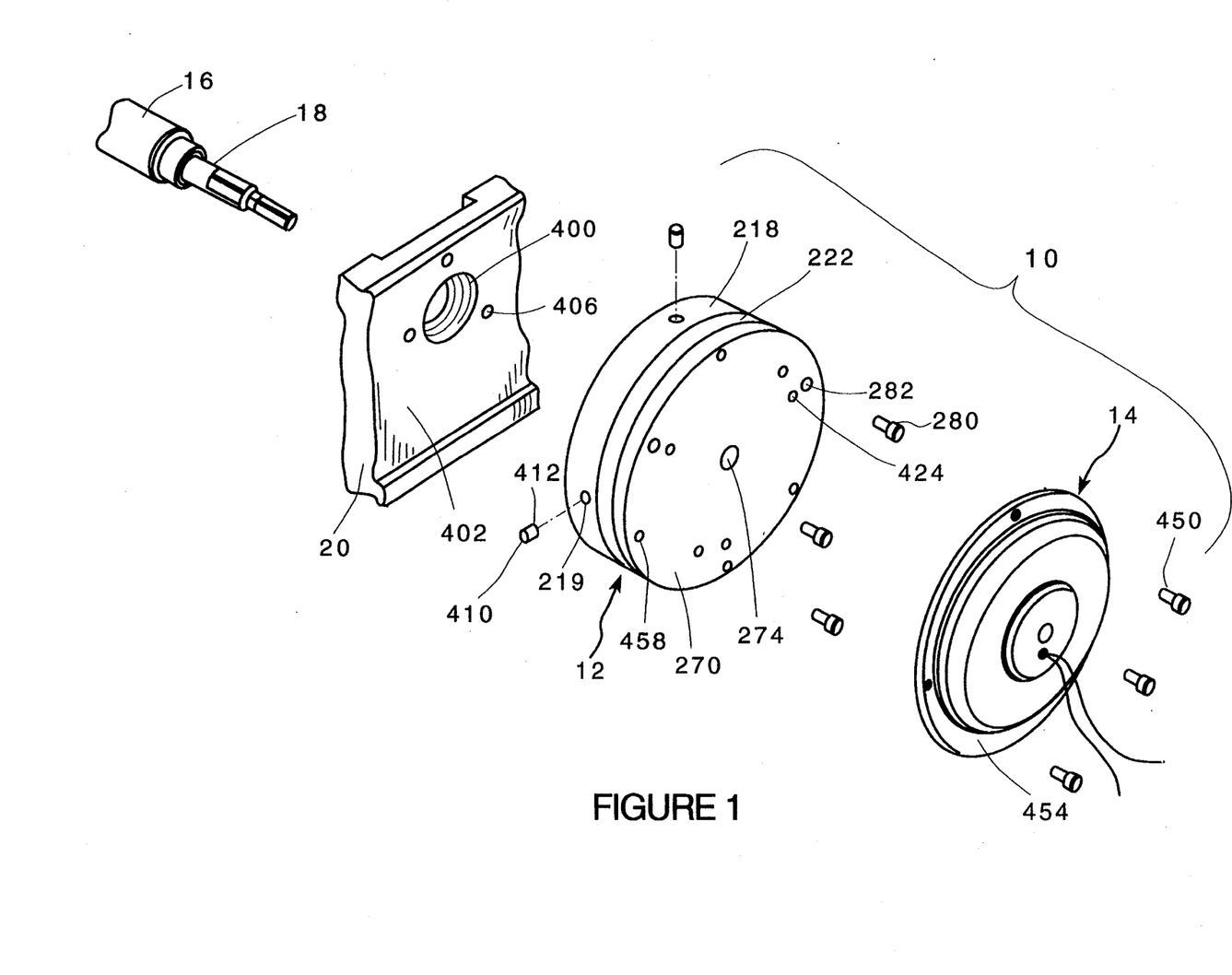
FIG. 1 depicts an exploded view of an integrated rotary drive assembly including, a shaftless electric DC motor, an hollow shaft assembly, a mounting frame and a rotatable body to be rotated in a controlled manner, e.g. a capstan.
Figure 3:
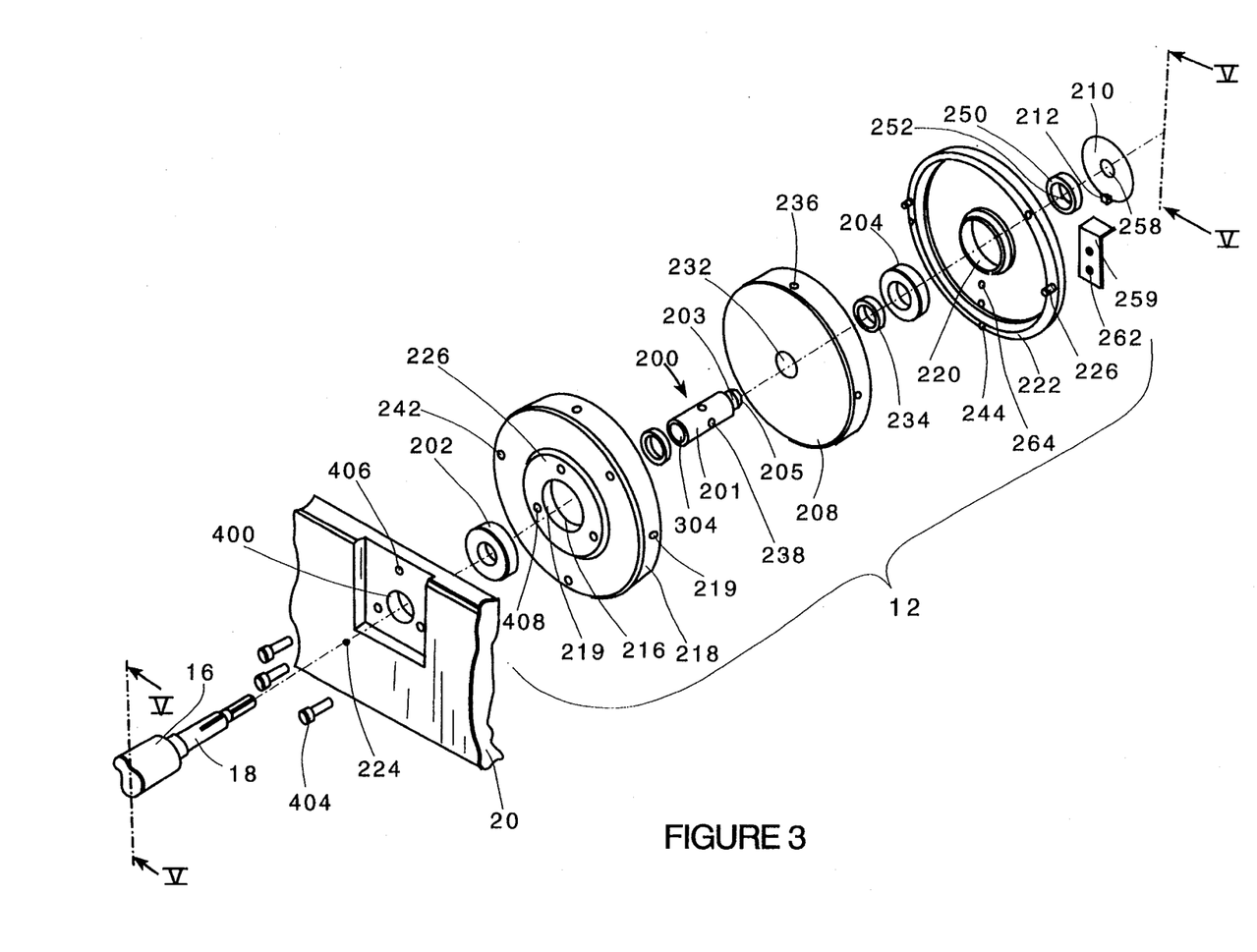
FIG. 3 depicts an exploded view of the hollow shaft assembly, including the mounting frame and capstan.

Hollow shaft assembly 12, shown assembled in FIG. 1 and in exploded view in FIG. 3, comprises a drive shaft, having a hollow portion indicated generally by referenced 200. The drive shaft 200 is supported at its first end by a first ball bearing 202 and at its second end by a second ball bearing 204. Hollow shaft assembly 12 further comprises an inertia flywheel 208 and a rotary optical encoder disk 210 each attached to and rotatable with the drive shaft 200. The hollow shaft assembly 12 further includes an optical encoder reader 212 mounted to a non-rotating member, detailed below, in proximity to the rotary encoder disk for monitoring the motion of the optical encoder disk 210 as it rotates with the drive shaft 200.

Figure 2:
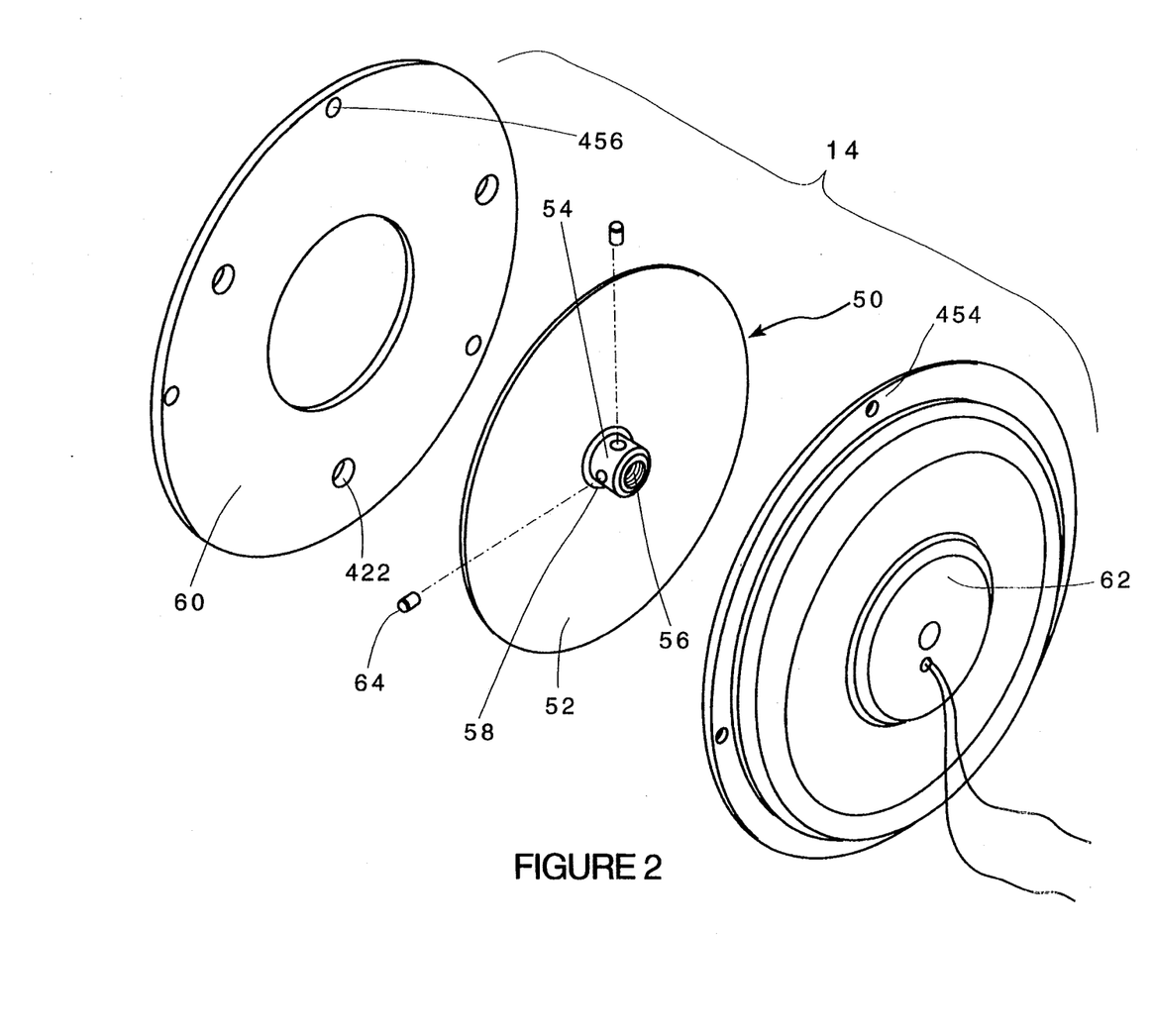
FIG. 2 depicts an exploded view of the shaftless DC motor.

Shaftless DC electric motor 14, shown in FIG. 2, comprises a shaft mountable armature assembly, indicated generally by reference numeral 50, a motor flux plate 60 and a motor stator 62. The mechanical coupling of assembly 12 and motor 14 to capstan 16 will be made evident in subsequent sections.

Shaftless DC electric motor 14 is a brushless type DC motor, being controllable by a closed loop electronic servo controller, not shown. In particular, it is a kit type DC motor which can be purchased in an unassembled state. Shaft mountable armature assembly 50 comprises a motor armature or rotor 52 having an integral shaft mounting hub 54, attached thereto. Mounting hub 54 includes center bore 56 passing therethrough. The diameter of bore 56 is selected to provide a slight clearance fit with the drive shaft 200. Hub 54 includes two threaded bores 58 each having an axis perpendicular to that of center bore 56 and perpendicular to each other. Threaded bores 58 allow mounting hub 54 to be secured to the drive shaft 200 by set screws 64. Such a motor is commercially available and is marketed e.g. by PMI MOTORS of Syosset N.Y. under the Part No. 1280035.

Figure 5:
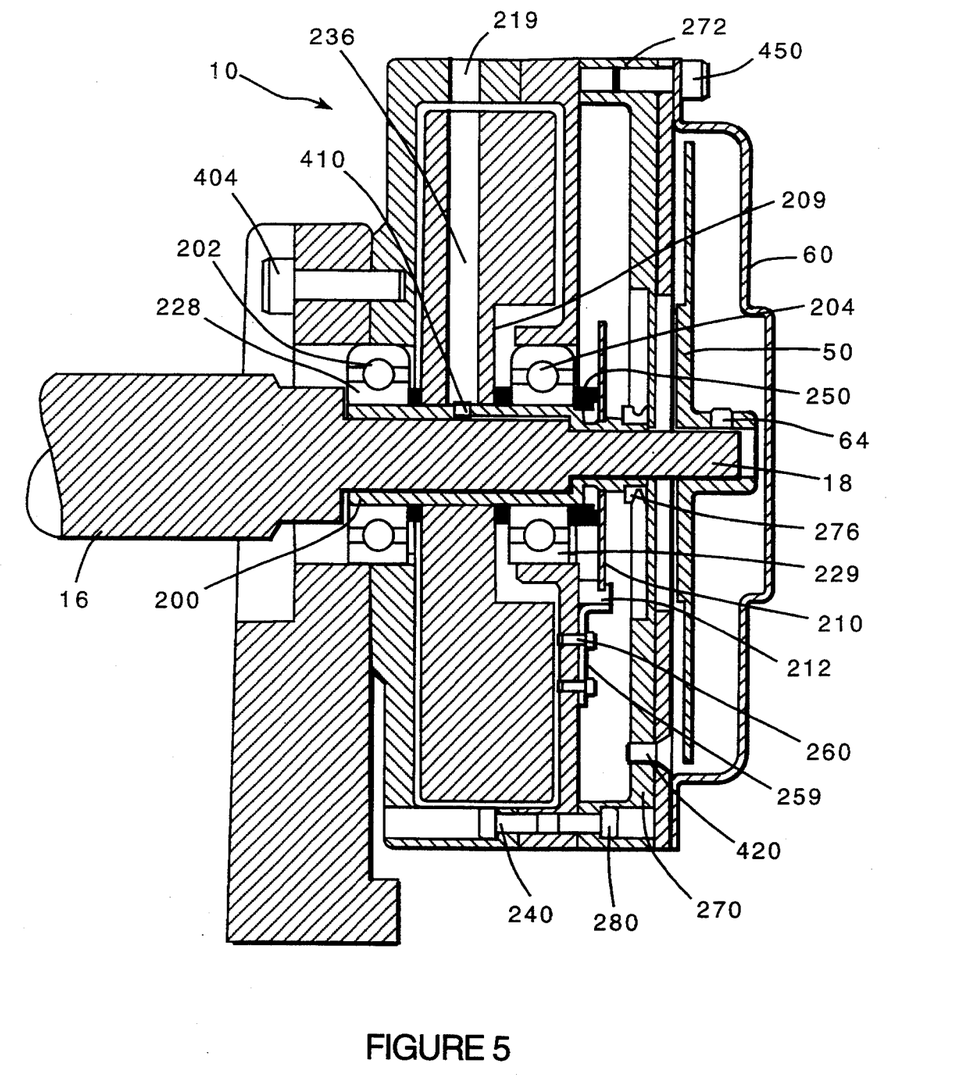
FIG. 5 is a section view, taken across a plane V—V in FIG. 3, which passes through the rotational axis, depicting an assembled hollow shall assembly, a DC motor, a capstan and a capstan coupling shaft mounted to a frame.

Hollow shaft assembly 12, shown assembled with capstan 16, frame 20 and motor 14 in FIG. 5, is assembled independently of the drive system and can stand as a self contained unit. Hollow shaft assembly 12 provides the functions of, rotatably supporting the driven end of capstan 16, providing a precision mounting interface between hollow shaft 200 and frame 20, which requires no alignment at assembly, providing a mounting interface for shaftless DC motor 14 and providing a mechanical coupling between capstan 16, flywheel 208, and optical encoder disk 210. In addition, assembly 12 provides a mounting interface for optical encoder reader 212.

Hollow shaft assembly 12 further provides a rotating inertia mass, flywheel 208, which is an integral feature of the electro-mechanical drive and control system, having the function of providing resistance to drive angular velocity fluctuations, caused e.g. by loading variations at capstan 16 or by current variations at DC motor 14. In addition, optical encoder disk 210 when aligned with encoder reader 212 provides an electronic feedback signal to a closed loop electronic control system, not shown. The feedback signal is representative of the angular position and velocity of the drive shaft 200. The feedback signal is fed to the closed loop electronic control system to control the output torque of DC motor 12 thereby providing motion control of capstan 16. Such rotary encoder devices are commercially available and marketed e.g. by COMPUTER OPTICAL PRODUCTS of Chatsworth, Calif.

A detailed description and assembly method for hollow shaft assembly 12 is provided below and is best illustrated by FIG. 3. Drive shaft 200 is a stopped hollow shaft having a largest outside diameter 201, an encoder disk interface diameter 203, a dust seal interface diameter 205 and an internal diameter 304 which forms a hollow portion fur coupling with the capstan 16.

First ball bearing 202 is pressed onto drive shaft 200 at diameter 201 such that the shaft and bearing edges are flush. First ball bearing 202 is also bonded to drive shaft 200 using a shaft locking adhesive.

An enclosure for housing and mounting the hollow shaft assembly 12 has a first enclosure section 218 and a second enclosure section 222. A through bore 216 passes through first enclosure section 218 and a counterbored bore 219 is bored from the side of frame mounting face 226. Counterbore 219 has a depth which is slightly less than the width of ball bearing 202. A second through bore 220 passes through second enclosure section 222 and has the same diameter as counter bore 219. First and second enclosure sections 218 and 222 are constructed such that through bore 220, through bore 216 and counterbore 219 all have a common axis 224. Axis 224 is also the rotation axis of the drive system. Alignment pins 226 are included in second enclosure section 222 to align through bores 216 and 220 and counterbore 219 along common axis 224 upon assembly of first enclosure section 218 with second enclosure section 222.

Counterbore 219 has a diameter consistent with providing a slight press fit with the outside diameter of first ball bearings 202 while through bore 220 has a diameter consistent with providing a slight clearance fit with the outside diameter of second ball bearing 204. Through bore 216 has a diameter less than that of counterbore 219 but no less than the diameter of inner ball bearing race 228, (see FIG. 5).

First ball bearing 202, now assembled to drive shaft 200 is installed into counterbore 219 such that hollow shaft 200 passes through bore 216. First ball bearing 202 is pressed in place such that it contacts the shoulder formed between through bore 216 and counterbore 219. First ball bearing 202 thus protrudes beyond first enclosure frame mounting surface 226 since the depth of counter bore 219 is less than the width of ball bearing 202. The protrusion of first ball bearing 202 is used to guide hollow shaft assembly 12 onto frame 20 in a later step.

Shaft spacer 230, has an annular shape with an internal diameter consistent with providing a clearance fit with drive shaft diameter 201 and an external diameter no larger than the outside diameter of first ball bearing inner race 228. Spacer 230 is installed onto shaft 200 providing a separation between bearing 202 and flywheel 208.

Flywheel 208, is a circular disk having a circular recess 209 near its center, (see FIG. 5) the purpose of which is to reduce the length of drive shaft 200 by providing space for second ball bearing 204. Flywheel 208 includes a center bore 232 passing therethrough, bore 232 having a diameter consistent with a light press fit with the drive shaft diameter 201. Flywheel 208 also includes two access holes 236, the purpose of which is to provide access to drive shaft threaded bores 238, the purpose of which will be detailed in a later section. Flywheel access holes 236 as well as drive shaft threaded bores 238 each have an axis perpendicular to rotation axis 224 and perpendicular to each other. Flywheel 208 is pressed onto drive shaft diameter 201 in an orientation which aligns the axes of access holes 236 and threaded bores 238. The width of spacer 230 is selected to establish the alignment of holes 236 with threaded bores 238 when flywheel 208 is pressed tightly against it. Flywheel 208 is also bonded to the drive shaft 200 with a shaft locking adhesive. A second shaft spacer 234, comparable to spacer 230, is installed onto shaft 200 providing separation between flywheel 208 and second ball bearing 204.

Second ball bearing 204, being comparable to first ball bearing 202, is pressed and bonded onto drive shaft 200 at diameter 201 such that it seats against spacer 234. Enclosure sections 218 and 222 are then assembled and a preload is applied to bearings 202 and 204 to remove radial play between the inner and outer bearing races. To apply the bearing preload, a shaft bonding adhesive is applied to the external diameter of second ball bearing 204. Second enclosure section 222 is then assembled with first enclosure section 218 such that alignment pins 226 align the two sections. Threaded fasteners 240 are installed into first enclosure section counterbored clearance holes 242 and engaged with second enclosure section threaded bores 244.

To preload the ball bearings 202 and 204, opposing forces are applied to the outer races of ball bearings 202 and 204 until the shaft bonding adhesive has cured. The preload allows the two ball bearings to act like a duplex bearing pair providing increased radial and axial stiffness when compared to a single bearing or an unpreloaded dual bearing mount. This increased stiffness is desirable for accurate angular position and velocity feedback from rotary encoder disk and reader 210 and 212. The preload force employed is consistent with ball bearing manufacturers recommendations, e.g. a force of 12 pounds.

Optical encoder disk hub 250 has a stepped annular shape with a smallest internal diameter 252 consistent with providing a press fit with drive shaft diameter 201 and a larger internal diameter 254 having the purpose of providing a narrow annular mounting interface with optical encoder disk 210. The outside diameter of hub 250 is no larger than the outside diameter of second ball bearing inner race 229.

Optical encoder disk 210 is a thin circular disk having typical features of an optical encoder disk such features being well known in the art. Disk 210 includes a center hole 258 having a diameter consistent with a slight clearance fit with drive shaft diameter 203. Disk 210 is installed onto drive shaft diameter 203 and bonded with hub 250 such that the disk features are concentric with and perpendicular to system rotation axis 224.

Optical encoder reader assembly 212 is secured to adjustment bracket 259. Bracket 259 mounts to second enclosure section 224 in an adjustable manner. Threaded fasteners 260 pass through adjustment bracket clearance holes 262 and engage with second enclosure section threaded bores 264 to clamp the bracket in place. Optical reader 212 can be adjusted for optimum performance by slightly loosening fasteners 260 and rotating disk 210 while observing the encoder reader electronic output signal. Such encoder alignment techniques are well known.

Dust cover 270 has a circular disk shape with a rib 272 at its outermost diameter and a center bore 274 passing therethrough. Center bore 274 has a diameter which is consistent with providing a clearance fit with drive shaft diameter 205 but not larger than the sealing diameter of shaft seal 276. Shaft seal 276 has the purpose of preventing contaminants from entering the optical encoder enclosure and has an internal mounting diameter which mates with drive shaft diameter 205. Such shaft seals are readily available commercially. Rib 272 has a depth dimension which ensures a sealing engagement of shaft seal 276 with dust cover 270. Dust cover 270 is assembled to second enclosure section 222 with threaded fasteners 280. Fasteners 280 are installed into dust cover counterbored holes 282 and engage with second enclosure threaded bores 244 providing a clamping force for assembly.

Hollow drive assembly 12 as described above is completely assembled and ready for mounting onto a rotary system. To couple capstan 16 with hollow shaft assembly 12 and with DC motor armature assembly 50, coupling shaft 18, machined onto capstan 16, provides certain coupling features. This coupling is described below.

Figure 4:
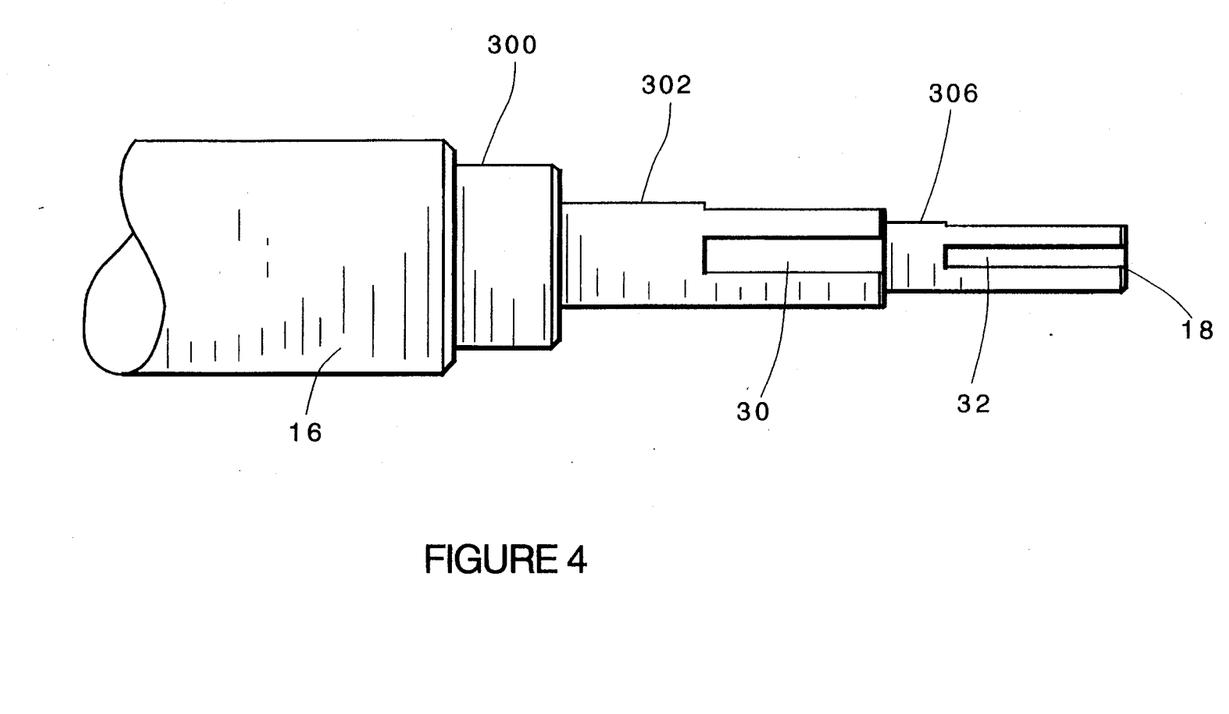
FIG. 4 depicts a detailed view of the capstan coupling shaft.

Coupling shaft 18 has a first diameter 300 which is greater than drive shaft internal diameter 304 but not larger than the outside diameter of first ball bearing inner race 228. Diameter 300 has the purpose of seating against ball bearing 202. Coupling shaft diameter 302 provides a mechanical coupling with drive shaft assembly 12 and has a dimension consistent with providing a very slight clearance fit with the hollow portion of drive shaft 200, internal diameter 304. Coupling shaft diameter 306 provides a mechanical coupling with DC motor armature hub 54 and has a diameter consistent with providing a very slight clearance fit with armature hub center bore 56.

To assemble the drive system, capstan 16 is first installed such that coupling shaft 18 passes through frame through bore 400. In general this need not be the first step however for the present invention, capstan 16 must be installed first due to other mounting constraints. Frame through bore 400 has a diameter consistent providing slight clearance fit with the outside diameter of first ball bearing 202. Frame through bore 400 is used to align the rotational axis of drive assembly 10 with the rotational axis of capstan 16. Frame mounting face 402 provides a seating surface for hollow drive assembly mounting face 226 and must be machined perpendicular to the axis of through bore 400.

Hollow shaft assembly 12 is guided over coupling shaft 18 such that shaft 18 passes through drive shaft 200. First ball bearing 202 is guided into frame through bore 400. Threaded fasteners 404 install through frame clearance holes 406 and engage with first separable enclosure threaded bores 408 to provide a clamping force to secure hollow shaft assembly 12 to frame 20.

To mechanically couple drive shaft 200 with coupling shaft 18, flywheel 208 is rotated to a position which aligns flywheel access holes 236 with first enclosure access holes 219. Capstan 16 is rotated to a position which aligns the normal axis of two coupling shaft flats 30 with the axis of hollow shaft threaded bores 238. Flats 30 machined on coupling shaft 18 having a normal axis perpendicular to rotation axis 224 and perpendicular to each other. Threaded set screws 410, having a flat clamping face 412, are installed through assess holes 219 and 236 and engaged with threaded bores 238 providing a clamping force against flat 30. This clamping action forces coupling shaft 18 against drive shaft inside diameter 304 providing a mechanical coupling of capstan 16 with drive shaft 200, flywheel 208 and encoder disk 210.

To install DC motor 14, motor flux plate 60 is mounted to dust cover 270 by threaded fasteners 420, (see FIG. 5). Fasteners 420 are installed through flux plate countersunk clearance holes 422, (see FIG. 2) and engage with dust cover threaded bores 424, (see FIG. 1).

Armature assembly 50 is guided onto coupling shaft 18 over diameter 306 placing the armature 52 toward flux plate 60. Shims are used during assembly to provide the correct spacing between armature 52 and flux plate 60, per the motor manufacturers specifications. Hub 54 is rotated to a position which aligns the normal axis of two coupling shaft flats 32 with the axis of threaded bores 58. Flats 32 machined on coupling shaft 18 having a normal axis perpendicular to rotation axis 224 and perpendicular to each other. Threaded set screws 64 having a flat clamping face are engaged with threaded bores 58 providing a clamping force against flats 32. This clamping action forces armature hub 54 against coupling shaft 18 providing a mechanical coupling between motor armature 52 and capstan 16.

Motor stator 62 is installed onto dust cover 270 using threaded fasteners 450. Fasteners 450, (see FIGS. 1 and 2) pass through stator clearance holes 454 and flux plate clearance holes 456 and engage with dust cover threaded bores 458 providing a clamping force for mounting.

The drive assembly 10 as described above is mechanically coupled to capstan 16 and mounted to frame 20. Electronic connections, not shown, provide current to DC motor stator 62 and access a feedback signal from encoder reader 212. A current applied to stator 62 causes armature 50 to rotate due to electromagnetic forces set up therebetween. Armature 50 now mechanically coupled to coupling shaft 18, rotates shaft 18 which is mechanically coupled to drive shaft 200 thus rotating flywheel 208, encoder disk 210 and capstan 16. In addition, whatever devices which may be mechanically coupled to capstan 16 are rotated as well. Under closed loop electronic control, the rotational motion can be controlled.

The specific features of the present invention which increase the fundamental torsional resonance frequency of drive 10 over prior drive systems are due mainly to the effective increase in shaft diameter which occurs when drive shaft 200 is coupled with coupling shaft 18. In addition, the reduction in shaft length which results from fitting bearing 204 within recess 209 of flywheel 208 also increases shaft stiffness. A further increase in system stiffness results from mounting encoder disk 210 between motor 14 and capstan 16 since prior drives place the encoder on the opposite side of motor 14 thus lengthening coupling shaft 18. In addition, the use of two preloaded ball bearings increases system stiffness eliminating potential low frequency torsional resonances. Finally, a conventional motor to encoder drive shaft coupling has been eliminated by the present invention by coupling all systems directly to capstan 16 through coupling shaft 18. This feature eliminates torsional resonance problems which are well known and occur when using conventional, e.g. flexible mechanical drive shaft couplings.

Other modifications can also be made without departing from the scope of the invention as defined in the following claims.

What we claim and desire to secure by Letters of Patent of the United States are the following:

1. An integrated rotary drive apparatus for rotating an element to be rotated in a controlled manner with respect to a mounting frame, comprising:
   (a) enclosure means comprising two sections, a first enclosure section with a first bore therethrough and a second enclosure section with a second bore therethrough, said first and second enclosure sections having registration means for aligning said first and second through bores along a common axis, at least one of said first and second enclosure sections being mounted to the mounting frame;
   (b) a drive shaft having a longitudinal rotational axis, said drive shaft passing through said first and second bores;
   (c) first bearing means supported by said first enclosure section and second bearing means supported by said second enclosure section for supporting said drive shaft for rotation with respect to said first and second enclosure sections and said mounting frame;
   (d) an inertia flywheel fixed to said drive shaft;
   (e) means for producing a feedback signal representative of the angular velocity of said drive shaft;
   (f) means for coupling said drive shaft to the element to be rotated in a controlled manner; and,
   (g) electrical motor means for driving said drive shaft, said inertia flywheel and said element to be rotated in a controlled manner.

2. The apparatus of claim 1 wherein said inertial flywheel is enclosed within said first and second enclosure sections.

3. The apparatus of claim 2 wherein said means for producing a feedback signal representative of the angular velocity of said drive shaft is enclosed within said first and second enclosure sections.

4. The apparatus of claim 1 wherein said means for producing a feedback signal representative of the angular velocity of said drive shaft is enclosed within said first and second enclosure sections.

5. The integrated rotary drive apparatus of claim 1 wherein said drive shaft is hollow for at least a portion of its longitudinal, rotational axis and wherein the hollow portion is used for coupling with said element to be rotated in a controlled manner.

6. The integrated rotary drive apparatus of claim 5 wherein said element to be rotated in a controlled manner includes a coupling shaft engaged with the hollow portion of said drive shaft for coupling said element to be rotated in a controlled manner and said drive shaft for rotation together.

7. The integrated rotary drive apparatus of claim 6 wherein said coupling shaft passes through and extends beyond said drive shaft and wherein said electrical motor means has an armature coupled to said coupling shaft and a stator mounted to at least one of said first or said second enclosure sections.

8. The integrated rotary drive apparatus of claim 7 wherein said first and second bearing means comprise ball bearings and wherein said ball bearings are preloaded to increase axial and radial stiffness of said integrated rotary drive apparatus.

9. The integrated rotary drive apparatus of claim 6 wherein said first and second bearing means comprise ball bearings and wherein said ball bearings are preloaded to increase axial and radial stiffness of said integrated rotary drive apparatus.

10. The integrated rotary drive apparatus of claim 1 wherein said drive shaft has a hollow portion extending for at least the distance along its longitudinal, rotational axis between and including said first and second bearing means.

11. The integrated rotary drive apparatus of claim 10 wherein said element to be rotated in a controlled manner includes a coupling shaft engaged with the hollow portion of said drive shaft for coupling said element to be rotated in a controlled manner and said drive shaft for rotation together.

12. The integrated rotary drive apparatus of claim 11 wherein said coupling shaft passes through and extends beyond said drive shaft and wherein said electrical motor means has an armature coupled to said coupling shaft and a stator mounted to at least one of said first or said second enclosure sections.

13. The integrated rotary drive apparatus of claim 11 wherein said first and second bearing means comprise ball bearings and wherein said ball bearings are preloaded to increase axial and radial stiffness of said integrated rotary drive apparatus.

14. The integrated rotary drive apparatus of claim 12 wherein said first and second bearing means comprise ball bearings and wherein said ball bearings are preloaded to increase axial and radial stiffness of said integrated rotary drive apparatus.

15. An integrated rotary drive apparatus for rotating an element to be rotated, in a controlled manner with respect to a mounting frame, said element to be rotated including a coupling shaft attached thereto, said apparatus comprising:
   (a) electric motor means, having an armature coupled to the coupling shaft of the element to be rotated, for rotating said coupling shaft and said element to be rotated in a controlled manner;
   (b) drive shaft means, positioned substantially between said electric motor means and said element to be rotated for providing a mechanical coupling interface therebetween, said drive shaft means being hollow along its longitudinal rotational axis to receive said coupling shaft for coupling therewith;
   (c) means for producing an electrical feedback signal representative of the angular velocity of said drive shaft means to monitor said angular velocity;
   (d) inertia mass means mounted to said drive shaft means for reducing velocity fluctuations of said element to be rotated; and,
   (e) first and second bearing means, mounted to said drive shaft means between said element to be rotated and said electric motor means, for rotationally supporting said drive shaft means and said coupling shaft, attached to said element to be rotated, with respect to said mounting frame.

16. The integrated rotary drive apparatus of claim 15 wherein said inertia mass means is mounted between said first and second bearing means.

17. The integrated rotary drive apparatus of claim 15 wherein said means for producing an electrical feedback signal representative of the angular velocity of said drive shaft means comprises a rotary optical encoder.

18. The integrated rotary drive apparatus of claim 15 wherein said element to be rotated in a controlled manner is a capstan.

19. The integrated rotary drive apparatus of claim 15 wherein said first and second bearing means comprise ball bearings and wherein said ball bearings are preloaded to increase axial and radial stiffness.

20. An integrated rotary drive apparatus for rotating an element to be rotated in a controlled manner with respect to a mounting frame, said element to be rotated including a coupling shaft attached thereto, said apparatus comprising:

(a) enclosure means comprising two sections, a first enclosure section with a first bore therethrough and a second enclosure section with a second bore therethrough, said first and second enclosure sections having registration means for aligning said first and second bores along a common axis, at least one of said first and second enclosure sections being mounted to the mounting frame;

(b) a drive shaft having a longitudinal rotational axis, said drive shaft passing through said first and second bores, said drive shaft also having a hollow portion extending for at least a distance along the longitudinal, rotational axis between and including said first and second bores and wherein the coupling shaft attached to said element to be rotated passes through said hollow portion of said drive shaft for coupling therewith;

(c) first bearing means supported by said first enclosure section and second bearing means supported by said second enclosure section for supporting said drive shaft for rotation with respect to said first and second enclosure sections;

(d) an inertia flywheel fixed to said drive shaft and enclosed within said first and second enclosure sections;

(e) a rotary optical encoder for producing a feedback signal representative of the angular velocity of said drive shaft, said rotary optical encoder being enclosed within said first and second enclosure sections; and, (f) electric motor means, comprising an armature and a stator, the armature being coupled to the coupling shaft of said element to be rotated and the stator being mounted to at least one of said first or second enclosure sections, for rotating said coupling shaft, said drive shaft and said element to be rotated in a controlled manner with respect to said first and second enclosure sections.

* * * * *